(12) United States Patent
Osterman

(10) Patent No.: US 10,415,539 B1
(45) Date of Patent: Sep. 17, 2019

(54) TIDAL ELECTRICITY GENERATOR

(71) Applicant: Melanie Osterman, Lansing, MI (US)

(72) Inventor: Melanie Osterman, Lansing, MI (US)

( * ) Notice: Subject to any disclaimer, the term of this patent is extended or adjusted under 35 U.S.C. 154(b) by 0 days.

(21) Appl. No.: 16/022,651

(22) Filed: Jun. 28, 2018

(51) Int. Cl.
*E02B 9/08* (2006.01)
*F03B 13/12* (2006.01)
*F03B 13/26* (2006.01)
*F03B 13/18* (2006.01)

(52) U.S. Cl.
CPC .............. *F03B 13/264* (2013.01); *E02B 9/08* (2013.01); *F03B 13/1815* (2013.01); *F03B 13/1845* (2013.01); *Y02E 10/38* (2013.01)

(58) Field of Classification Search
CPC .................................. E02B 9/08; Y02E 10/38
USPC ...................................................... 405/75, 76
See application file for complete search history.

(56) References Cited

U.S. PATENT DOCUMENTS

| | | | |
|---|---|---|---|
| 1,105,249 A | 7/1914 | Busto | |
| 1,338,326 A * | 4/1920 | Peck | F03B 13/262 |
| | | | 405/76 |
| 1,377,163 A | 5/1921 | Pool | |
| 1,482,713 A | 2/1924 | Stein | |
| 1,822,806 A * | 9/1931 | Geary | F03B 13/262 |
| | | | 60/507 |
| 3,567,953 A | 3/1971 | Lord | |
| 3,959,663 A | 5/1976 | Rusby | |
| 4,206,601 A * | 6/1980 | Eberle | F03B 13/186 |
| | | | 405/76 |
| 4,249,085 A | 2/1981 | Kertzman | |
| 4,359,868 A | 12/1982 | Slonim | |
| 4,544,849 A | 10/1985 | Choi | |
| 6,009,707 A | 1/2000 | Alkhamis | |
| 6,389,810 B1 * | 5/2002 | Nakomcic | F03B 13/186 |
| | | | 60/398 |
| 6,711,897 B2 | 3/2004 | Lee | |
| 6,863,806 B2 | 3/2005 | Stark et al. | |
| 7,298,054 B2 * | 11/2007 | Hirsch | F03B 13/1845 |
| | | | 290/42 |
| 7,562,526 B2 * | 7/2009 | Lee | F03B 13/1825 |
| | | | 60/507 |
| 8,004,103 B2 * | 8/2011 | Brantingham | F03B 13/1845 |
| | | | 290/53 |
| 8,125,097 B1 * | 2/2012 | Lomerson, Sr. | F03B 13/1845 |
| | | | 290/53 |
| 8,604,631 B2 | 12/2013 | Rohrer | |
| 9,038,377 B2 | 5/2015 | Anteau | |
| 9,151,266 B2 * | 10/2015 | Bulaclac, Jr. | F03B 13/1855 |
| 9,234,495 B2 | 1/2016 | Anteau | |
| 2005/0035602 A1 | 2/2005 | Gard | |

(Continued)

*Primary Examiner* — Frederick L Lagman
(74) *Attorney, Agent, or Firm* — John D Ritchison; Ritchison Law Offices, PC

(57) ABSTRACT

A Tidal Electricity Generator device and system providing a simple and effective way to generate electricity by harnessing tidal motion. The device has no parts to churn up the water, and does not actively force water through blades or screens. The device works passively to extract energy from the water by capturing the buoyancy of a bobber which rises and falls with the tides and/or gravity. Thus the kinetic energy of the tides is converted into mechanical energy which can then be transferred through a series of gears and other components to power an electric generator or other electric power grid. With this system, there is nothing to harm the environment or any sea life.

4 Claims, 9 Drawing Sheets

(56) References Cited

U.S. PATENT DOCUMENTS

| | | |
|---|---|---|
| 2006/0202483 A1 | 9/2006 | Gonzalez |
| 2007/0108774 A1* | 5/2007 | Estes .................... F03B 13/262 |
| | | 290/53 |
| 2010/0140945 A1* | 6/2010 | Andujar ............... F03B 13/182 |
| | | 290/53 |
| 2010/0296875 A1* | 11/2010 | Thomson .................. E02B 9/08 |
| | | 405/224 |
| 2010/0307149 A1* | 12/2010 | Kwok .................... F03B 17/04 |
| | | 60/496 |
| 2011/0113771 A1 | 5/2011 | Foster et al. |
| 2014/0083090 A1 | 4/2014 | Larsson |
| 2014/0117672 A1* | 5/2014 | Therriault ............. F03B 13/262 |
| | | 290/53 |
| 2015/0226176 A1 | 8/2015 | Ryan et al. |
| 2018/0283347 A1* | 10/2018 | Eli-Novak .............. F16H 19/04 |

* cited by examiner

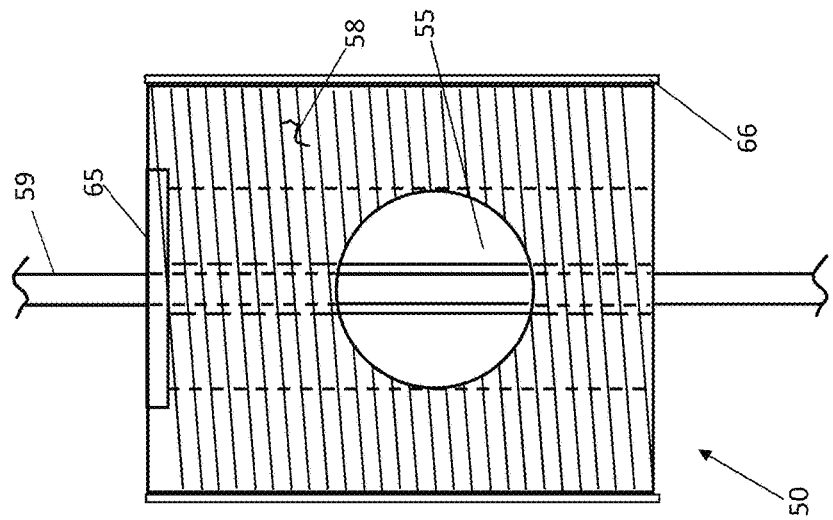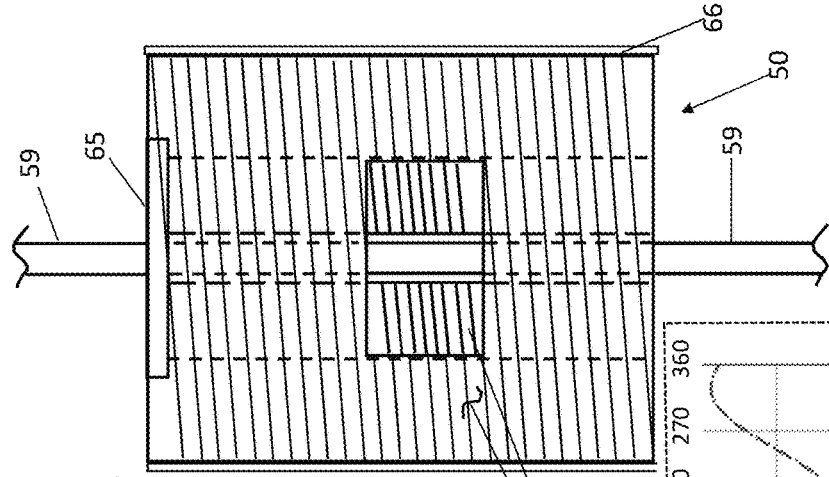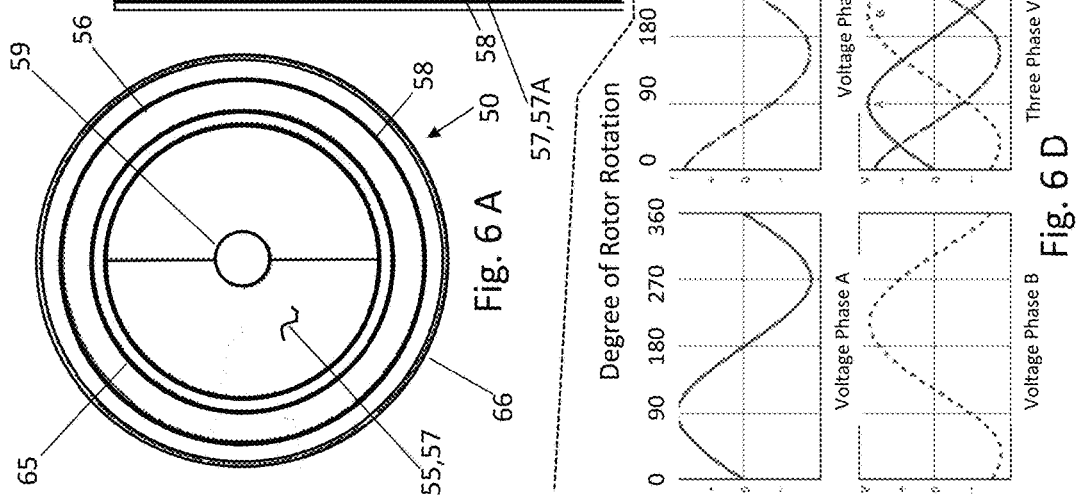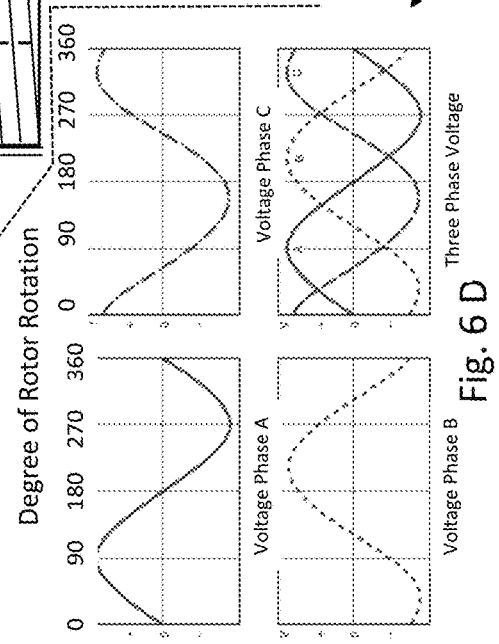

TIDAL ELECTRICITY GENERATOR

CROSS-REFERENCE TO RELATED APPLICATIONS

This application has no claims to previous applications.

FIELD OF INVENTION

This invention relates to a Tidal Electricity Generator device and system. This relates to apparatus for converting the energy of ocean waves to another form of energy, e.g. electricity and it relates to wave energy converters where either all or a substantial portion of the energy captured or produced is from one or more substantially submerged or floating devices relying on wave-induced differences in hydrostatic pressure which produce useful work. This invention pertains generally to electricity generators and more specifically to a generator that converts the hydrodynamic power of tidal motion into electricity. The Tidal Electricity Generator also relates to the field of power generation, and more specifically to power generation systems and methods based on renewable energy and pressure differential principles and to generating energy from water motion on the surface of the ocean or sea by a method and apparatus for converting energy from waves to useful forms of mechanical power.

The Tidal Electricity Generator further relates to improvements in power generation, more particularly ones that convert kinetic energy from oceanic waves into a useable form of energy beneficial to society and it relates to generators that can be used to extract energy from waves in a body of water by converting such energy to useful energy. The apparatus and system relates specifically to the field of sea-wave power generation plants. Here, the invention and concept relate to a power plant having a buoyant working member motivated by the vertical rise and fall of a surface of the ocean tide operated devices. Also, the Tidal Electricity Generator relates to the method and apparatus for deriving mechanical power from tides and waves. Finally this developed. concept relates to an improved system and apparatus for the utilization of the energy developed by tidal and wave movements of natural bodies of water.

FEDERALLY SPONSORED RESEARCH

None.

SEQUENCE LISTING OR PROGRAM

None.

BACKGROUND—FIELD OF INVENTION and PRIOR ART

As far as known, there are no Tidal Electricity Generator device and system comparable to this Osterman idea and invention. It is believed that this product is unique in its design and technologies.

BACKGROUND

Lately, there has been increased interest in methods for generating electricity from tidal motion, especially in methods that will perform adequately without endangering sea life or the environment. There have been prior attempts to design such methods, but there still remains a need for an apparatus and method that will make use of both tides and gravity and provide an option for electromagnetic field generation. With present concerns over renewable energy, global warming, carbon emissions and limited access to or availability of traditional fossil fuels, sources of alternative, renewable, energy are becoming more and more important. Interest has increased in utilizing the tides to produce energy which do not cause pollution or require the use of scarce, non-renewable and/or expensive resources. Solar, wind and wave power systems and utilizing tidal energy for generating electrical energy are known. Solar thermal energy systems work when there is sufficient sunlight, otherwise energy needs to be stored during sunlight hours and released overnight if continuous energy output is required. However, if insufficient thermal energy cannot be stored during daylight hours, there is a risk of energy output being exhausted. Wind energy requires sufficient movement of air to generate power from wind turbines. While wind turbine technology has progressed and wind energy has become more cost effective, there remains the challenge of intermittency and of siting multiple wind turbines sufficient to generate the required amount of renewable energy. Wind turbines create a visual and noise impact on land that is not always acceptable to locals. Wind farms have now been sited out at sea in order to benefit from more reliable prevailing winds and to reduce the environmental impact from the presence of the tall wind turbines.

Since realizing the application of electricity, various methods have been used to generate electricity. The traditional way of generating electricity through burning mineral fuels brings increasingly serious pollution problems to the modern society. As energy sources based on fossil fuels become ever more expensive to maintain and their environmental cost is realized and quantified, the world has turned to renewable energy sources to combat these disadvantages of traditional energy generation methods. A sharply increasing demand curve continues to push the need for innovative new ways to generate power. There is thus a current need for new sources of energy that utilize renewable sources to generate that energy. While the nuclear power plants hide non-negligible danger of nuclear pollution. Thus, generating electricity by wind power and ocean tidal power is suggested. In recent years, there has been increased emphasis on the need to exploit renewable energy so that it significantly contributes to global energy production. A combination of government targets, media representation of the issues associated with non-renewable energy sources, and ever increasing energy costs have created a powerful driving force for the development of renewable energy systems. Negative impacts of fossil fuels on the environment are well known, as are the problems, dangers and high costs associated with nuclear energy. Harnessing of the huge natural abundance of renewable energy on the other hand is constrained merely by ones capability of capturing and supplying it at an economically viable price. However, an obstacle to power generation is the power input needed for use in the generation scheme. The input power required will impact the viability of the system. Therefore, there is a need for a power generation scheme that utilizes natural phenomenon to both reduce the input power required to operate the system and to provide the energy source that the system converts to some form of usable energy. One sees that the ocean and seawater is constantly changing direction both vertically and horizontally and constantly changing in nature from potential (height) to kinetic (motion) energy and combinations in between. The extraction of energy from the seas and oceans is an accepted concept in the field of renewable energy. One major benefit of wave energy is that there is almost always at least some energy to be extracted thereby making energy potentially more reliable than solar thermal or wind energy and more environmentally acceptable in the sense of having lower visual, and potentially lower noise, impact on the local environment. Wave power from seas and oceans are not regular. While there may be an average period and average wave height at a given location and given time, there will still be variations from wave to wave, and within each wave. Therefore one finds that the change from high to low tide is more consistent and predictable.

It is a natural phenomenon that occurs approximately every twelve (12) hours, the ocean, due to the gravity that the moon exert on the ocean water, creates a cycle in which the level of the water rises a certain number of feet (between 2 to 3 feet and 18 to 20 feet), and then it comes down approximately the same number of feet, the movement is called Tides (high and low, rise or ebb). The variations on the amount of feet that the tide goes up or down is dependent on the faces of the moon among other factors—increasing or decreasing gravitational force, weather and currents, and certain locations on the earth have tides that are much higher than in others. The tide phenomenon is expected every day with a constant precision of time, two cycles every 24 hours and approximately 20 minutes with two high tides and two low tides in an alternated sequence. The predictable swelling and shrinking can be used to generate energy.

Many of previous inventions concentrate on the capture of the energy from the flow of the water and on the energy from the lifting and falling of the ocean surface when applied to a floating platform that is tied or rendered immobile laterally but when floating moves up and down freely and that is attached to a gear and then to a generator or dynamo that creates electricity. Many of those which were based on tidal energy used pulley systems and/or rack and pinion systems and were concerned primarily with obtaining continuous rotation of a shaft on both rise and fall of tides to provide continuous electrical generation. These prior art systems were by their very nature limited to use in areas having very marked tidal differences. Wave motors are forced to rely upon the vagaries of nature to produce waves strong enough to activate them.

The existing designs for generating electricity from wave power can be divided into six main categories: floating attenuators, surge converters, oscillating water column devices, overtopping devices, submerged pressure differential devices and point absorbers. Most of these can be either floating or based on the sea bed. Each of these different approaches has their own inherent advantages and disadvantages. Hundreds of uniquely different ocean wave energy converters have been proposed over the last century and are described in the patent and commercial literature. Less than a dozen designs are currently ocean deployed as "commercial proto-types." Virtually all of these initial designs suffer from high cost per average unit of energy capture. This is primarily due to the use of heavy steel construction necessary for severe sea-state survivability combined with (and in part causing) low wave energy capture efficiency. Many subsurface devices are designed for near shore sea bed deployment and suffer from the condition that ocean waves lose substantial energy as they approach shore (due to breaking or reflected waves and bottom hydrodynamic friction effects). The Osterman device avoids this since it works from the change of sea level and not wave energy.

PRIOR ART

As far as known, there are no Tidal Electricity Generator device and system or the like. A diligent novelty search was completed. The following was revealed: A. U.S. Pat. No. 4,359,868 was issued to Slonim in 1982 and called an Ocean wave energy converter. It described a device for converting the energy of ocean waves into electricity that comprises a buoyant body that floats on the surface of the water and rises and falls with the waves. It is fixedly secured to the buoyant body at a depth in the region of still water not affected by the waves, is a bucket wheel or bucket chain which will accordingly rise and fall with the buoyant body. But as the water surrounding the bucket wheel or chain is still, the wheel or chain will be caused to rotate or circulate, respectively. This movement of the wheel or chain is transmitted to a generator or other energy conversion device on the buoyant body, and thence to shore. B. U.S. Pat. No. 6,711,897 was issued to Lee in 2004 and was named an Installation of power generation by ocean wave. Here is shown an installation to apply ocean energy to power generation. The installation includes a floater, lever, chain, ratchet wheel, flywheel, generator, cable, etc. The floater and weight fixed to the floater move up and down with the motion of wave and drive the strength enlargement mechanism made up of a number of levers to travel alternately and pull the heavy flywheel to rotate constantly. The rotation of the flywheel enables the generator to run and yield electricity. C. U.S. Pat. No. 8,604,631 issued to Rohrer in 2013 was entitled an Ocean wave energy converter with multiple capture modes. It is described as an ocean wave energy converter utilizes a substantially submerged elongated absorption barrier oriented parallel to oncoming wave fronts having one or more substantially submerged air or gas filled variable volume vessels located between a relatively fixed position rigid rearward surface and a moving rigid wave front facing surface. The vessel(s) are compressed by oncoming overhead wave crests both by increased hydrostatic pressure and wave kinetic impact, thereby capturing both wave potential energy (hydrostatic or heave) and kinetic (impact or surge) energy. Vessel compression is resisted by hydraulic, pneumatic, mechanical or linear electric generation means. Vessel re-expansion, when wave troughs are overhead, utilize hydraulic, pneumatic, electric, and/or mechanical (gravity mass or spring) means. Here the wave energy capture is enhanced by venting vessel air or gas directly to and from atmosphere or low pressure surface expandable vessel(s), which venting may also drive pneumatic turbine-generators, and by oncoming wave shoaling and focusing means. D. U.S. Pat. No. 9,038,377 issued to Anteau in 2015 is called a Power generator. Here is shown the power plant disclosed which is an engine that derives its usefulness in the pursuit of energy generation by utilizing hydrostatic pressure differentials found or created in various liquids, gases or solutions, such as but not limited to water and air. It is generally provided as a two-stroke piston cycle power generating system, wherein the actions of the pistons perform work or replenish working fluid from a lower head to a higher head, and can be utilized to generate power, pump fluids, or perform work, for example. Multiple power generating systems are interconnected to provide continuous and constant power generation through a penstock and turbine system.

E. U.S. Pat. No. 9,151,266 issued to Bulaclac, Jr. in 2015 is called a Wave energy electricity generator. It teaches improvements in an ocean wave energy conversion unit that converts kinetic energy from oceanic waves into useable form of energy that will benefit society called and Aquatamer. The unit is designed to be modular in nature where the units can be deployed to function individually or assembled into groups where units will rely on each other and function together as a whole. Each individual unit has an electrical output. As a group (Colony) during deep sea surface applications, the electrical output of each Aqua-Tamer unit will be consolidated and used to operate a water-electrolysis operation that produces Oxygen Gas (O2) and Hydrogen Gas (H2). This production of O2 and H2, instead of electrical output, is designed to eliminate the requirements of an Ocean-wide electrical grid system and still facilitate an economic logistically efficient) method of energy transportation (energy in a gas state). F. U.S. Pat. No. 9,234,495 was issued to Anteau in 2016 and shows another Power generator. It teaches power plant disclosed is an engine that derives is usefulness in the pursuit of energy generation by utilizing natural pressure differentials found in various liquids and gases, such as but not limited to water and air. It is generally a two-stroke piston cycle engine, wherein the actions of the pistons perform work, which can be utilized to generate power, pump fluids, or perform work, for example. G. US Patent Application 20110113771 submitted by Foster, et al. in 2011 and named a Wave Powered Generator. Shown is the generator comprised as a float which is movable in response to wave motion in a body of water, a submersible reaction member of adjustable buoyancy, with at least two buoyancy configurations, connected to the float and arranged to resist movement of the float caused by the wave motion, an energy converter for converting such reciprocal movement to useful energy; and biasing means such as a spring for directionally biasing the reciprocal movement. Displacement of the float relative to the reaction member is permitted and reciprocal movement generated in response to such displacement. H. US Patent Application 20140083090 was submitted by LARSSON in 2014 and was titled a Sea-wave Power Generation Plant. It shows a sea-wave power generation plant including a turbine having an inlet opening and an outlet opening; a rig; and an axially extending pump unit. The stationary body is connected to the rig. The pump unit includes an axially extending stationary body, a diaphragm connected to the stationary body, and a pump chamber for a fluid. The pump chamber is at least partly defined by the diaphragm. The pump chamber is connected to the inlet opening of the turbine. The pump unit includes an axially extending movable body connected to the diaphragm. The movable body in the radial direction is arranged for reciprocating movement in relation to the stationary body to alternately compress and expand the pump chamber to pump the fluid to the turbine. I. US Patent Application 20150226176 submitted by RYAN, et al. in 2015 is named a Wave energy conversion. It demonstrates a wave energy converter (WEC) has a body portion with a face and at least one flexible membrane bounding at least part of a volume of a fluid to form a variable volume cell. The membrane is inclined from vertical providing a flow smoothed passage for wave energy from a wave to travel over the WEC whilst deforming at least one membrane towards the body to compress the fluid. The cell(s) can be submerged or floating. The inclination of the at least one membrane assists conversion of potential and kinetic energy of the wave to pressure within the fluid. Fluid pressure within the WEC cell(s) and/or system can be optimized to suit wave and/or performance conditions.

J. U.S. Pat. No. 4,249,085 by Kertzman issued in 1981 was called a Tide operated power generating apparatus. This taught an improved tide operated power generating apparatus is disclosed in which a hollow float, rising and falling with the ocean tide, transmits energy to a power generator. The improvement comprises means for filling the float with water during the incoming tide to provide a substantial increase in the float dead weight during the outgoing tide. Means are further provided to then empty the float before the outgoing tide whereby the float becomes free to rise again on the next incoming tide. K. U.S. Pat. No. 3,567,953 issued to Lord in 1971 was entitled a Tide-operated power plant. It shows a tide-operated power plant consisting of an electric generator mounted on a float, a driving train for said generator, including a reverse and operated by a member stationary with respect to the water bottom, whereby up-and-down movement of the float will drive the generator. L. U.S. Pat. No. 3,959,663 issued to Rusby in 1976 taught a Tide-powered electrical generator. Here is shown a taught a tide-powered electrical generator wherein the energy from successive rising tides is stored in the form of potential energy for selective conversion to electricity. A float is constrained to vertical motion and it raises on successive tides a weight by means of a jack bar to reach a maximum predetermined height on a stable support structure where the weight is supported until release for the generation of electricity. Provision is made for the prevention of damage to the generator by excessive tidal rises. M. U.S. Pat. No. 4,544,849 was issued to Choi in 1985 and called a Method and apparatus for tidal electric power generation using the buoyancy energy of the tide. This shows a method and apparatus for tidal electric power generation using the buoyancy energy of the tide. It includes a buoyant container having a balancing buoyant room and a flood gate, a power transmission apparatus having a converting apparatus, and a four-way valve. The buoyancy force of the buoyant container is decreased during the upward movement of the container while the kinetic energy decreases during the downward movement of said container. With control of the four-way valve, the decreasing buoyancy force is partially compensated for by the pumping of water from the buoyant container and the kinetic energy is reinforced by filling the buoyant container with water. The converting apparatus comprises two conic helical gears. At the ebb and flow of the tide, the brake is released and instantaneous force is produced. Proposed is a way that greater energy can be obtained with little energy loss compared with the conventional manner.

N. U.S. Pat. No. 6,009,707 by Alkhamis in 2000 provides a Buoyancy driven energy producing device. It is an apparatus and method are provided for generating energy from a source of pressurized fluid by harnessing buoyancy and/or gravitational forces. The apparatus includes at least one container having an inlet port on a top side for receiving the pressurized fluid while the container is at the top of a tank or stand and an a drainage port on a bottom side for draining the pressurized fluid while the container is at the bottom of the tank or stand; a chain belt attached to the container such that the chain belt rotates as the container travels; and a shaft connected to the chain belt for producing rotational energy. O. U.S. Pat. No. 6,863,806 issued to Stark, et al. in 2005 was named a Barge-mounted tidal-powered desalinization system. His shows a tidal-powered desalinization system is mounted on a barge that oscillates about fixed pier structures, generating a two-way pumping action. The two-way pumping action is changed to a single direction flow of seawater. The sea water is directed into an on-board desalinization system. Fresh water is produced and collected in reservoirs, without an intervening generation of electricity. P. U.S. Pat. No. 1,105,249 issued to BUSTOS in 1914 was called a Tide Motor. This was an improved tide motor, which is operated by the variations of the level of the sea-variations which are produced by the tides along the shore and natural inlets, and in all places where the waves do not merely wash the shore, but roll at considerable differences between their levels. Q. U.S. Pat. No. 1,377,163 was issued to POOL in 1921 and called a Method and apparatus for deriving mechanical power from and tides waves. This shows a method and apparatus for deriving mechanical power from tides and waves. More particularly it relates to confining a liquid in a hermetically sealed buoyant chamber and restricting the flow of the liquid from one end of the sealed chamber to another, making said liquid, as it flows from one part of the chamber to the other, generate power. This power may be electrical, hydraulic, hydro-electrical, spring or other power.

R. U.S. Pat. No. 1,482,713 was issued to STEIN in 1924 and known as an Apparatus for recovering power from tides and waves. This shows an improved system of apparatus for the utilization of the energy developed by tidal and wave movements of natural bodies of water, and by the winds, for the production of power for domestic purposes, such as factories, electric lighting, land and marine motor transportation, etc. S. US Patent Application 20050035602 submitted by Gard in 2005. This shows a Tidal generator. Here the device has a basic function using gravity effects on a fluid to cause energy to be developed in a manner different from the present hydro systems, alleviating the mechanical losses present in their design, as well as the limitations of placement, and layout that cause unnatural disturbances in surrounding natural systems. This design allows the device to be placed effectively on a low level system as well as a high, and still produce an effective output. This is accomplished by ganging low level hydro elevation differences such as elevation differences from Lake Erie versus Lake Ontario for energy Production. T. US Patent Application 20060202483 submitted by Gonzalez in 2006 is called Capturing energy from the rise and fall of the tides and waves of the ocean. Here is taught a heavy floating devise with one or multiple bellows, accordions or balloons, attached on top, that are large enough and strong enough to cover all or most of the floating device's surface and can expand and contract as much as the floating devise lifts them and brings them down pushed by the tides and the waves, because these accordions are firmly attached above, to a structure that is immobile, high enough, strong enough to withstand the pushing and pulling that the floating device will exert through the accordions or bellows, and to contain the lateral movement of the floating device within certain parameters so that the floating device goes almost exclusively up or down, those bellows will inflate or deflate depending of the direction up or down of the floating device, air will be pushed in or out of the accordion through constricted outlets controlled by valves some of them allow air in, some of them allowing the air out, directing, through ducts, the accelerated air to move a circular propeller or impeller, that will move a shaft to an accelerating gear box and that accelerated movement goes to a generator or alternator to generate electricity. U. US Patent Application 20070108774 was submitted by Estes in 2007 and called an Archimedes power generator. This is the Archimedes Power Generator as a process designed to produce electric power from rising and falling water levels of the ocean due to tidal motion. The generator is composed of a barge enclosed within a containment area that has holes built into the containment walls allowing the barge to rise and fall in unison with the tides. On the top of the barge is a turbine, or series of turbines. Each turbine is connected to a toothed shaft that is installed through the barge (using seals to keep out water) and solidly attached to the bottom of the containment area. The toothed shaft is linked to a toothed gear on the turbine so that as the barge rises and falls, the armature of the turbine spins, creating the potential for the production of electricity. None of the prior art addresses the production of electricity by tidal power in the simple, direct manner with fewer parts and more simple conversion mechanisms to transform tidal energy to mechanical then electrical power such as shown and taught by Osterman in the Tidal Electricity Generator device and system.

Problem Solved

The improvements and problems solved by the Tidal Electricity Generator device and system with the above prior art solutions are that the structure of the generation devices are too complex and efficiency in electromechanical energy conversion is low. Therefore, the cost in utilizing such method and device in ocean energy power generation is too high. Therefore, there is a need for a simple, efficient and low-cost method of power generation by ocean wave eliminating the defects. Further, as the energy sources based on fossil fuels become ever more expensive to maintain and their environmental cost is realized and quantified, the world has turned or is rapidly turning to renewable energy sources to combat these disadvantages of traditional energy generation methods. A sharply increasing demand curve continues to push the need for innovative new ways to generate power. Thus, there is a current need for new sources of energy that utilize renewable sources to generate that energy. It is important to note that an obstacle to power generation is the power input needed for use in the generation scheme. The input power required will inherently reduce the efficiency, and therefore the viability of the system. Therefore, there is a need for a power generation scheme that utilizes natural phenomenon such as the shifting tides to both reduce the input power required to operate the system and to provide an energy source greater than the input power that the system can convert to a form of usable energy.

SUMMARY OF THE INVENTION

This invention is a Tidal Electricity Generator device and system. The present invention solves the above-mentioned problems by providing a simple and effective way to generate electricity by harnessing tidal motion. The present invention has no parts to churn up the water, and does not actively force water through blades or screens. Instead, the device works passively to extract energy from the water by capturing the buoyancy of a bobber which rises and falls with the tides and/or gravity. Thus the kinetic energy of the tides is converted into mechanical energy which can then be transferred through a series of gears and other components to power an electric generator or other electric power grid. With this system, there is nothing to harm the environment or any sea life.

The concept is similar to a toy top spinning. The handle/shaft is pumped up and down inside the metal top and creates the spin. Simple. Now picture that top turned upside-down with gravity pushing down as the wheel (the top) lowers slowly to the low tide. As the top falls down (with the tidal action) the tops pumping handle/central threaded shaft allows the body of the top (wheel of the generator) to spin. To repeat the process with the top, one uses her hand to raise the top back. For the generator wheel, it raises by the power of the tide returning ever so slowly to high tide again. One can repeat the motion of the top. Similarly, the exchange of position of the wheel from high to low tide generated motion on the threaded shift which can be transformed to electricity. The Tidal Electricity Generator employs a simple machine—the screw. Using this same simple principle, imagine a large buoyant wheel lying horizontally (the upside-down top) and balanced on its axle (the pumping handle). Going a step further, imagine the buoyant wheel that is floating in the ocean and its threaded axle is fastened/anchored to the sea floor. At high tide, the wheel is locked in place at the top of its axle. The tide goes out and the wheel is poised in mid-air above the water (like ones hand holding up the top). The lock is released and the wheel ever so slowly spins down its threaded column until it rests on the water's surface again (low tide). As the tide (like ones hand) once more rises, and with the rising motion, the floating wheel is pushed vertically upward back to top of the threaded column and the process begins again. The lock holding the wheel in the up position can be released at such a point that the wheel would be spinning down with or just behind the tide to make full use of the tides amplitude/height.

The scale of the wheel can be of such size that a great deal of electricity would be produced by friction, gears, magnets, pressure—any number of ways. And there is also the possibility of creating power from the buoyancy as the float is pushed back up the column. Weights can be employed to move in and out along the spokes of the wheel to give a controlling force to the spin and slow it down or speed it up much as an ice skater controls the speed of a spin by moving her arms in and out. Another analogy is to view the Tidal Electricity Generator as the similar or equivalent of a big windmill of a wind farm. The sails of the windmill would be like the spokes of the wheel. The gear shaft of the windmill is the threaded column that the wheel spins upon. In a windmill, the sails turn the gear shaft, but in this idea the reverse would be true, the stationary gear shaft would cause the turn of the sails. And unlike the windmill which must depend on the vagaries and variations of the wind, the tide is as certain as death and taxes. Finally, the Tidal Electricity Generator as a very large wheel would be moving so slowly that sea birds might well land on it and not notice the movement and there would be nothing moving in the water to churn it up or to sieve it through that might injure sea life or the environment. Thus there is no more impact than a barge resting at anchor might do. No chemicals or pollutants to store and spill, no smoke or gas to release to the air. And conceivably it would be nearly silent and not esthetically unpleasant to look at, no more so than watching the spin of a slow windmill. The working elements of this invention are among the most simple and elegant: the screw, the tides and gravity.

The preferred embodiment of a Tidal Electricity Generator device and system comprise a plurality of stationary units affixed to the sea floor, each stationary unit generally comprising a vertical threaded column within a waterproof housing; further, a traveling element is mounted on the threaded column so as to freely move up and down the column; an external float is positioned outside a waterproof housing as the float is coupled to the traveling element wherein as the float rises and falls with the tides, the traveling element travels up and down the column, provides motion to a generator which in turn has a power cable to an electrical power grid. A first alternative embodiment is a multi generator and shaft tidal generator made of durable, strong, resilient and lasting materials and comprising at least one generator on an individual floating platform with a threaded shaft; a threaded bushing between shaft and individual floating platform; a generator with a means to be driven by the platform as the platform slowly traverses essentially vertically from a tidal change from high tide to low tide back to high tide; a set of connection plates and fasteners from the threaded shaft connected to a foundation; and a group of interconnected power lines from at least two generators to an electrical power grid wherein as the float rises and falls with the tides, the traveling element travels up and down the column, provides motion to a generator which in turn has a power cable to an electrical power grid. A second alternative embodiment is a Tidal Electricity Generator device and system made of durable, strong, resilient and lasting materials and comprising: (a). a great wheel/platform with a group of predetermined intermediate spokes, a set of moveable speed control weights, and a lock wherein the great wheel/platform engages an essentially vertical friction roller column; (b). a threaded shaft with clockwise and/or counter clockwise configurations through a threaded bushing between the threaded shaft and the great wheel/platform, wherein the great wheel/platform traverses the threaded shaft essentially vertically during the change from a low to a high tide, and wherein the threaded shaft is supported at a sea floor with a first foundation; (c). the friction roller column with a gear means to turn an essentially horizontal drive shaft and supported by a second foundation; (d). a generator, the horizontal driveshaft and the gear engaging the friction roller and rotating to create electricity within the generator; (e). the first and second foundations complimented and comprising connection plates and fasteners configured to connect the first and second foundation respectively to the threaded shaft and the friction roller column; (f). an interconnected power line from the generator to a switch and a transformer, and ultimately to an electrical power grid wherein as the float rises and falls with the tides, the traveling element travels up and down the column, provides motion to a generator which in turn has a power cable to an electrical power grid.

The newly invented Tidal Electricity Generator device and system can be manufactured in both low volume and high volume production.

Objects and Advantages

There are several objects and advantages of the tidal electricity generator device and system. There are currently no Tidal generating systems that are effective at providing the objects of this invention. The Tidal Electricity Generator has various advantages and benefits:

| Item | Advantages |
|---|---|
| 1 | Runs/operates continuously because the tide always runs twice a day - it doesn't stop when it is cloudy or the wind doesn't blow. As long as the moon and oceans exist, the tides will flow. |
| 2 | Is pollution free and creates no air pollution. |
| 3 | Has no waste or waste products. |
| 4 | Is ecologically friendly. It doesn't strain water or interfere with fish or other wildlife. It creates no adverse currents. |
| 5 | Runs quiet compared to alternative systems, it's only sounds are that of the generators spinning. |
| 6 | Can be built in any size. A home-use size to an industrial size to a Hoover Dam size. |
| 7 | Runs and turns slow enough for birds to rest upon it. |
| 8 | Can be coupled with offshore wind generators as part of their base column. |

Finally, other advantages and additional features of the present Tidal Electricity Generator will be more apparent from the accompanying drawings and from the full description of the device. For one skilled in the art of energy conversion methods and systems using ocean and seawater tide changes, it is readily understood that the features shown in the examples with this system are readily adapted to other types of energy conversion systems and devices.

BRIEF DESCRIPTION OF THE DRAWINGS

The accompanying drawings, which are incorporated in and constitute a part of this specification, illustrate an embodiment of the Tidal Electricity Generator device and system that is preferred. The drawings together with the summary description given above and a detailed description given below serve to explain the principles of the tide generator device and system. It is understood, however, that the tide generator device and system is not limited to only the precise arrangements and instrumentalities shown.

FIGS. 6 A through 6 D are sketches of the floating generator with components shown.

DESCRIPTION OF THE DRAWINGS—REFERENCE NUMERALS

Figure 1:
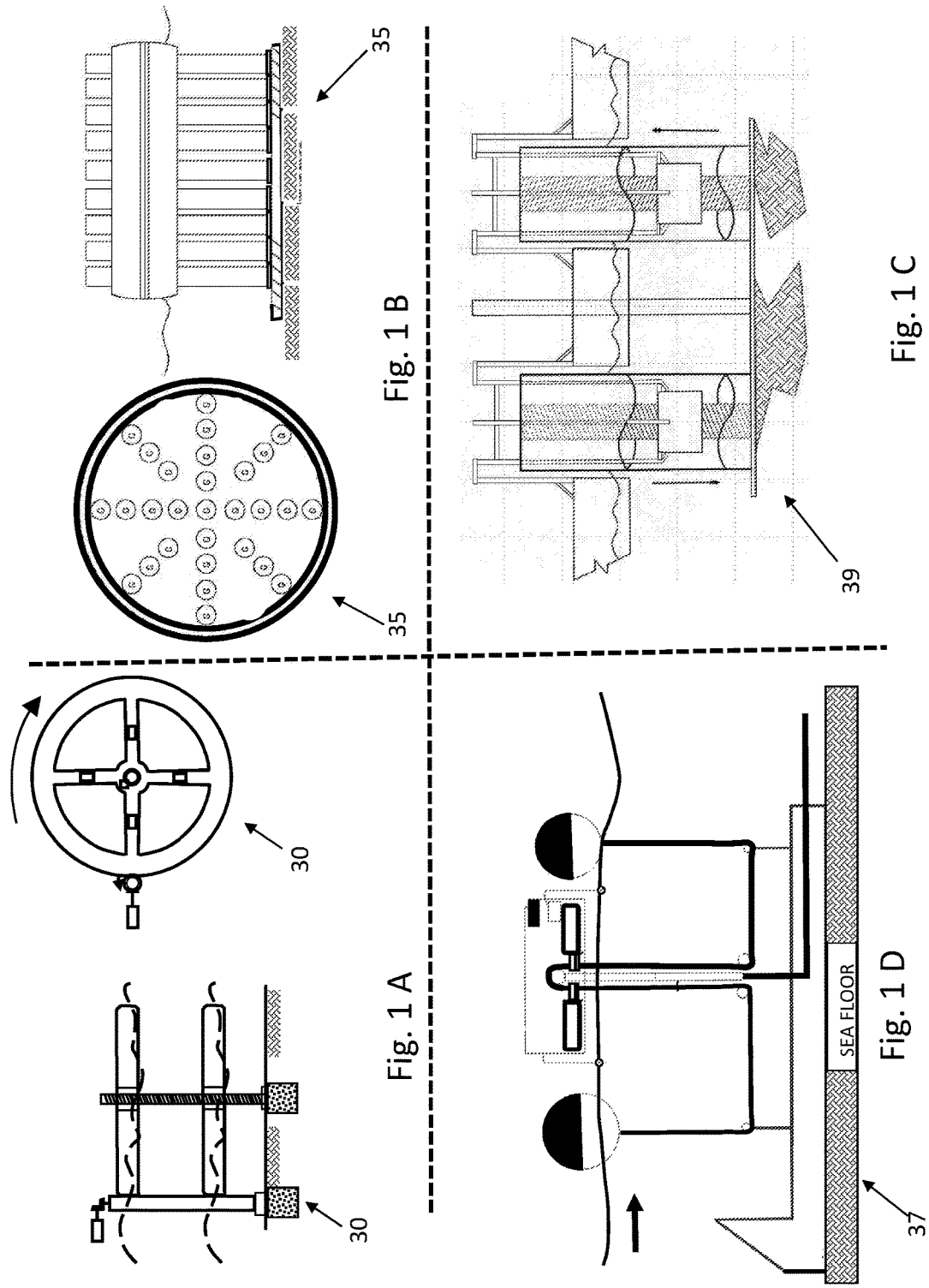
FIGS. 1 A through 1 D are sketches of the general styles of Tidal generator devices and systems.

The following list refers to the drawings:

| Reference numbers | |
|---|---|
| Ref # | Description |
| 30 | preferred great wheel tidal electric generator 30 |
| 33 | combination 33 great wheel 30 and floating generators 50 |
| 35 | multi shaft and generators on large floating platform tidal electric generator 35 |
| 37 | outlying bobber and pulley tidal electric generator 37 |
| 39 | double shafted tidal electric generator 39 |
| 40 | threaded shaft (clockwise) 40 |
| 40A | threaded shaft (counter clockwise) 40A |
| 41 | threaded bushing 41 between shaft 40, 40A and wheel 48 or platform 51 |
| 42 | generator 42 |
| 43 | driveshaft 43 |
| 44 | gears 44 |
| 45 | optional slidable/movable speed control weights 45 |
| 46 | wheel lock 46 |
| 48 | great wheel 48 |
| 49 | friction roller column 49 |
| 50 | floating generator 50 with rotator and starter |
| 51 | floating platform 51 |
| 52 | platform stabilizer columns 52 |
| 53 | protection enclosure (tube) 53 |
| 54 | support super structure 54 and connect to platform 51 |

-continued

| Reference numbers | |
|---|---|
| Ref # | Description |
| 55 | magnet 55 |
| 56 | buoyant core 56 |
| 57 | rotor coil 57 and windings 57A |
| 58 | stator coil 58 and lamination core |
| 59 | threaded shaft 59 |
| 60 | floating bobbers 60 |
| 61 | cable 61 |
| 62 | exterior surface 62 of generator 50 |
| 63 | pulley 63 |
| 64 | typical three phase electrical power chart 64 |
| 65 | bushing plate 65 |
| 66 | generator housing/surface and structure 66 |
| 70 | bobber (floating) 70 |
| 71 | cable attachment 71 |
| 72 | pulleys 72 |
| 75 | pulley support column 75 |
| 77 | drive box 77 from cable 71 to generator 42 |
| 90 | high tide 90 |
| 95 | low tide 95 |
| 96 | connection plate and fasteners 96 from shaft 40, 40A to foundation 99 |
| 97 | foundation 97 for full tidal electric generator system 30, 35, 37 and 39 |
| 98 | sea floor 98 |
| 99 | foundation 99 for shafts |
| 100 | collection grid 100 |
| 101 | power lines 101 from generators 42 to switch 102 |
| 102 | transformer/grid switch 102 |
| 104 | electrical power grid 104 |
| 105 | sliding connector 105 from generator 50 |
| 106 | power ring 106 |
| 200 | prior art 200 patent application 2011/0113771 |
| 202 | prior art 202 U.S. Pat. No. 4,249,085 |
| 204 | prior art 204 U.S. Pat. No. 9,038,377 |
| 206 | prior art 206 U.S. Pat. No. 3,959,663 |
| 208 | prior art 208 U.S. Pat. No. 6,863,806 |
| 210 | prior art 210 U.S. Pat. No. 6,009,207 |
| 212 | prior art 212 U.S. Pat. No. 1,105,249 |
| 214 | prior art 214 patent application 2007/0108774 |

DETAILED DESCRIPTION OF PREFERRED EMBODIMENT

This invention relates to a Tidal Electricity Generator device and system. This relates to apparatus for converting the energy of ocean waves to another form of energy, e.g. electricity and it relates to wave energy converters where either all or a substantial portion of the energy captured or produced is from one or more substantially submerged devices relying on wave induced differences in hydrostatic pressure which produce useful work. This invention pertains generally to electricity generators and more specifically to a generator that converts the hydrodynamic power of tidal motion into electricity. The Tidal Electricity Generator also relates to the field of power generation, and more specifically to power generation systems and methods based on renewable energy and pressure differential principles and to generating energy from water motion on the surface of the ocean or sea by a method and apparatus for converting energy from waves to useful forms of mechanical power.

The Tidal Electricity Generator further relates to improvements in power generation, more particularly ones that convert kinetic energy from oceanic waves into a useable form of energy beneficial to society and it relates to generators that can be used to extract energy from waves in a body of water by converting such energy to useful energy. The apparatus and system relates specifically to the field of sea-wave power generation plants. Here, the invention and concept relate to a power plant having a buoyant working member motivated by the vertical rise and fall of a surface of the ocean tide operated devices. Also, the Tidal Electricity Generator relates to the method and apparatus for deriving mechanical power from tides and waves. Finally this developed concept relates to an improved system and apparatus for the utilization of the energy developed by tidal and wave movements of natural bodies of water The advantages for the Tidal Electricity Generator device and system 30 are listed above in the introduction. Succinctly the benefits are that the device:

A. Runs/operates continuously because the tide always runs twice a day—it doesn't stop when it is cloudy or the wind doesn't blow. As long as the moon and oceans exist, the tides will flow.

B. Is pollution free and creates no air pollution.

C. Has no waste or waste products.

D. Is ecologically friendly. It doesn't strain water or interfere with fish or other wildlife. It creates no adverse currents.

E. Runs quiet compared to alternative systems, it's only sounds are that of the generators spinning.

F. Can be built in any size. A home-use size to an industrial size to a Hoover Dam size.

G. Runs and turns slow enough for birds to rest upon it.

H. Can be coupled with offshore wind generators as part of their base column.

The preferred embodiment of a Tidal Electricity Generator device and system comprise a plurality of stationary units affixed to the sea floor, each stationary unit generally comprising a vertical threaded column within a waterproof housing; further, a traveling element is mounted on the threaded column so as to freely move up and down the column; an external float is positioned outside a waterproof housing is the float is coupled to the traveling element wherein as the float rises and falls with the tides, the traveling element travels up and down the column, provides motion to a generator which in turn has a power cable to an electrical power grid. A first alternative embodiment is a multi generator and shaft tidal generator made of durable, strong, resilient and lasting materials and comprising at least two generators on an individual floating platform with a threaded shaft; a threaded bushing between shaft and individual floating platform; a generator with a means to be driven by the platform as the platform slowly traverses essentially vertically from a tidal change from high tide to low tide back to high tide; a set of connection plates and fasteners from the threaded shaft connected to a foundation; and a group of interconnected power lines from the at least two generators to an electrical power grid wherein as the float rises and falls with the tides, the traveling element travels up and down the column, provides motion to a generator which in turn has a power cable to an electrical power grid. A second alternative embodiment is a Tidal Electricity Generator device and system made of durable, strong, resilient and lasting materials and comprising: (a). a great wheel/platform with a group of predetermined intermediate spokes, a set of moveable speed control weights, and a lock wherein the great wheel/platform engages an essentially vertical friction roller column; (b). a threaded shaft with clockwise and/or counter clockwise configurations through a threaded bushing between the threaded shaft and the great wheel/platform, wherein the great wheel/platform traverses the threaded shaft essentially vertically during the change from a low to a high tide, and wherein the threaded shaft is supported at a sea floor with a first foundation; (c). the friction roller column with a gear means to turn an essentially horizontal drive shaft and supported by a second foundation; (d). a generator, the horizontal driveshaft and the gear engaging the friction roller and rotating to create electricity within the generator; (e). the first and second foundations complimented and comprising connection plates and fasteners configured to conned the first and second foundation respectively to the threaded shaft and the friction roller column; (f). an interconnected power line from the generator to a switch and a transformer, and ultimately to an electrical power grid wherein as the float rises and falls with the tides, the traveling element travels up and down the column, provides motion to a generator which in turn has a power cable to an electrical power grid.

There is shown in FIGS. 1-9 a complete description and operative embodiment of the Tidal Electricity Generator device and system. In the drawings and illustrations, one notes well that the FIGS. 1-14 demonstrate the general configuration and use of this product and system. The various example uses are in the operation and use section, below.

The accompanying drawings, which are incorporated in and constitute a part of this specification, illustrate an embodiment of the Tidal Electricity Generator device and system 30 that is preferred. The drawings together with the summary description given above and a detailed description given below serve to explain the principles of the Tidal Electricity Generator device and system 30. It is understood, however, that the device and system 30 is not limited to only the precise arrangements and instrumentalities shown. Other examples of system and devices and uses are still understood by one skilled in the art of energy conversion methods and systems using ocean and seawater tide changes to be readily adapted to other types of systems and devices and still be well within the scope and spirit shown here.

FIGS. 1 A through 1 D are sketches of the general styles of Tidal generator devices and systems. Depicted in this introduction are the preferred great wheel tidal electric generator 30; a multi shaft and generators on large floating platform tidal electric generator 35; an outlying bobber and pulley tidal electric generator 37; and a double shafted tidal electric generator 39.

Figure 2:
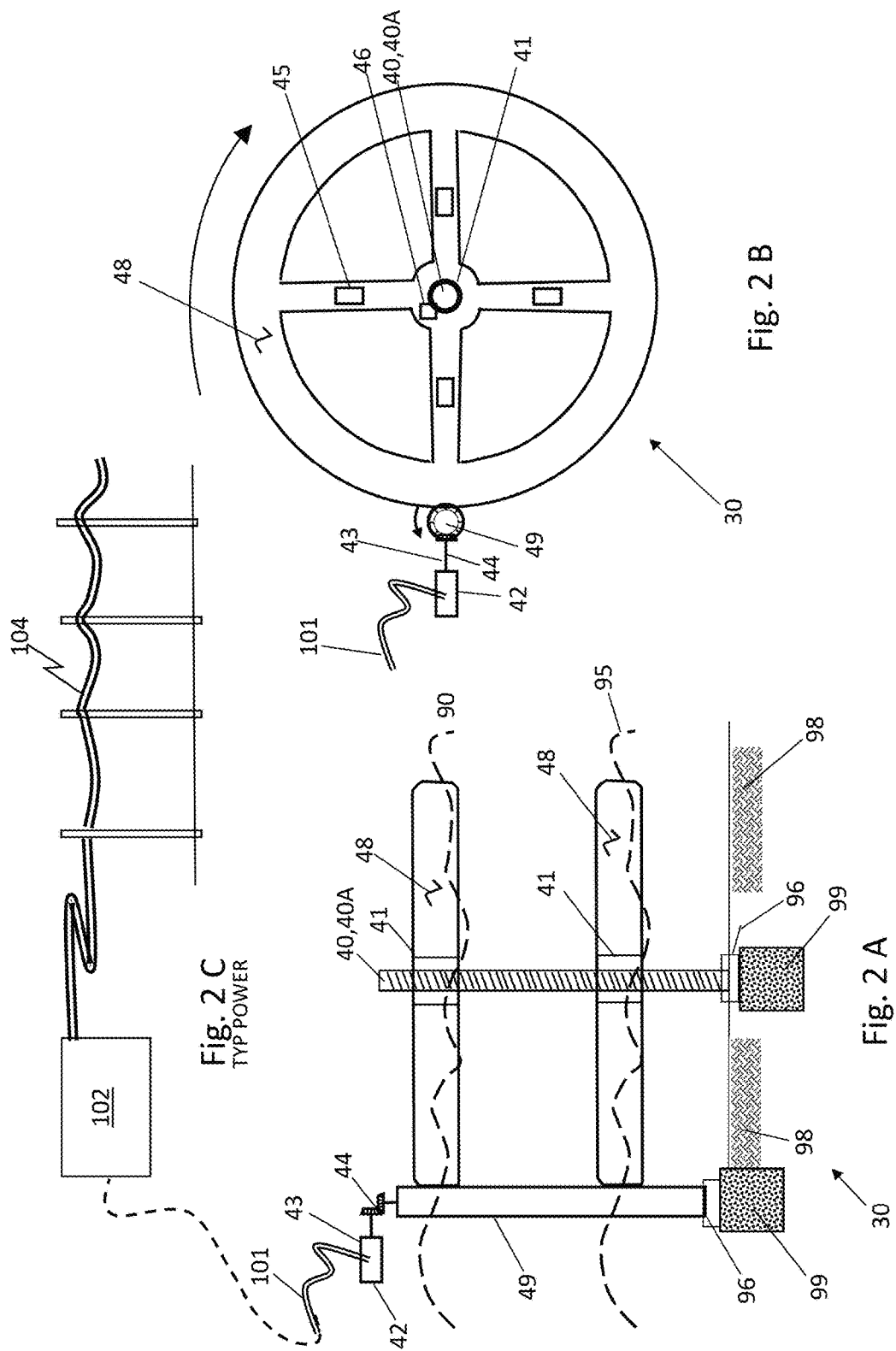
FIGS. 2 A though 2 C are sketches of the general preferred great wheel tidal generator device with components and features noted.

FIGS. 2 A though 2 C are sketches of the general preferred great wheel tidal generator device 30 with components and features noted. Components and features demonstrated here include: the preferred great wheel tidal electric generator 30; a threaded shaft (clockwise) 40; a threaded shaft (counter clockwise) 40A; a threaded bushing 41 between shaft 40,40A and wheel 48 or platform 51; a generator 42, small, medium large as application dictates; a driveshaft 43; a set of gears 44; an optional slidable/movable speed control weights 45; a wheel lock 46; a great wheel 48; a friction roller column 49; the high tide 90; the low tide 95; a set of connection plates and fasteners 96 from shaft 40, 40A; to foundation 99; a foundation 97 for full tidal electric generator system 30; the sea floor 98; a foundation 99 for shafts; a collection grid 100; a group of interconnected power lines 101 from generators 42 to switch 102; a transformer/grid switch 102; and an electrical power grid 104.

Figure 3:
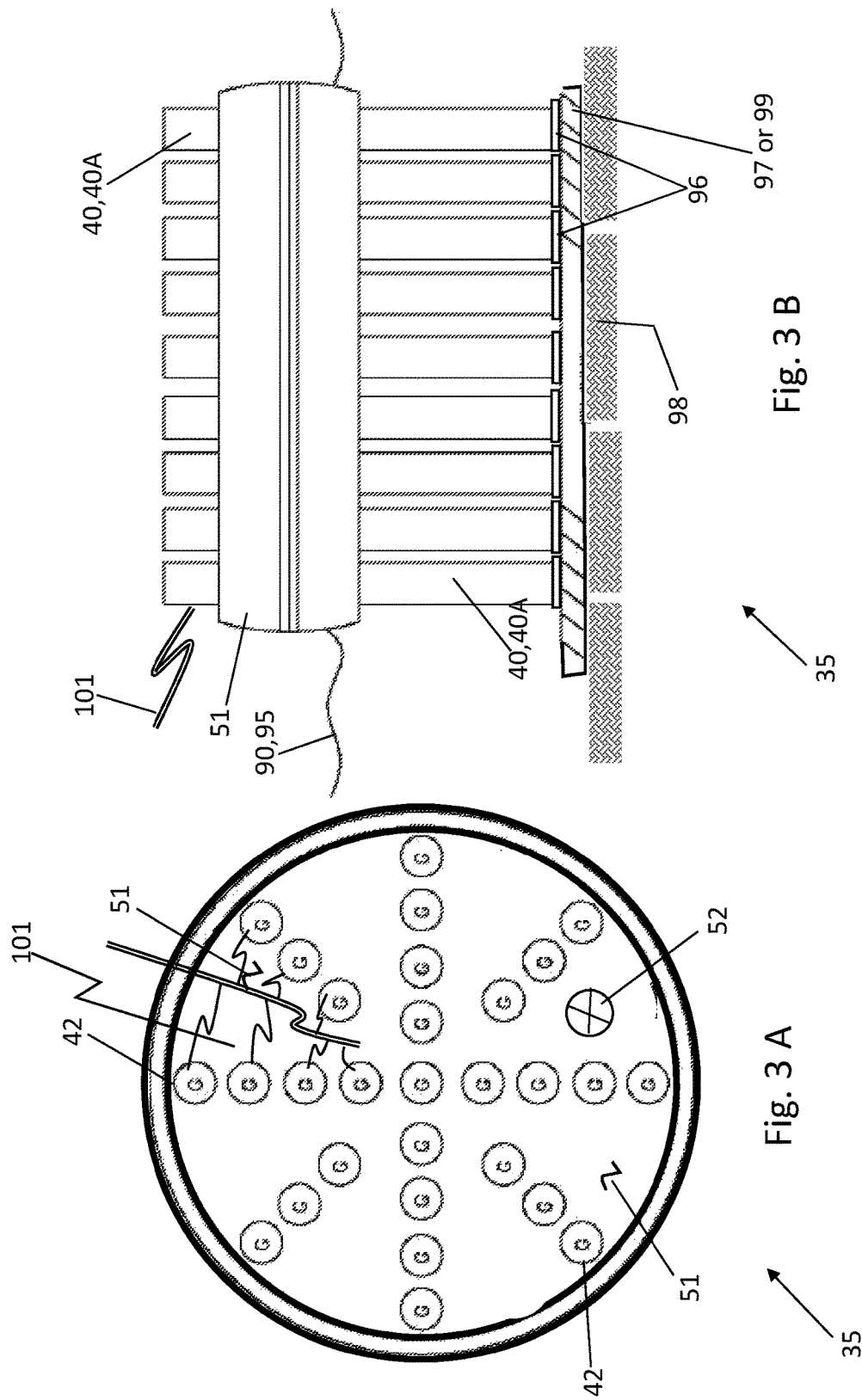
FIGS. 3 A and 3 B are sketches of the multi generator and shaft alternative tidal generator with the components and features shown from generally a top view.

FIGS. 3 A and 3 B are sketches of the multi generator and shaft alternative tidal generator with the components and features shown from generally a top view. Provided here are the following: a multi shaft and generators on large floating platform tidal electric generator 35; a threaded shaft (clockwise) 40; a threaded shaft (counter clockwise) 40A; a threaded bushing 41 between shaft 40,40A and wheel 48 or platform 51; a generator 42, small, medium large as application dictates; a floating platform 51; the high tide 90; the low tide 95; a set of connection plates and fasteners 96 from shaft 40, 40A; a foundation 99; a foundation 97 for full tidal electric generator system 35; the sea floor 98; a foundation 99 for shafts; and a group of interconnected power lines 101 from generators 42 to an electrical power grid 104.

Figure 4:
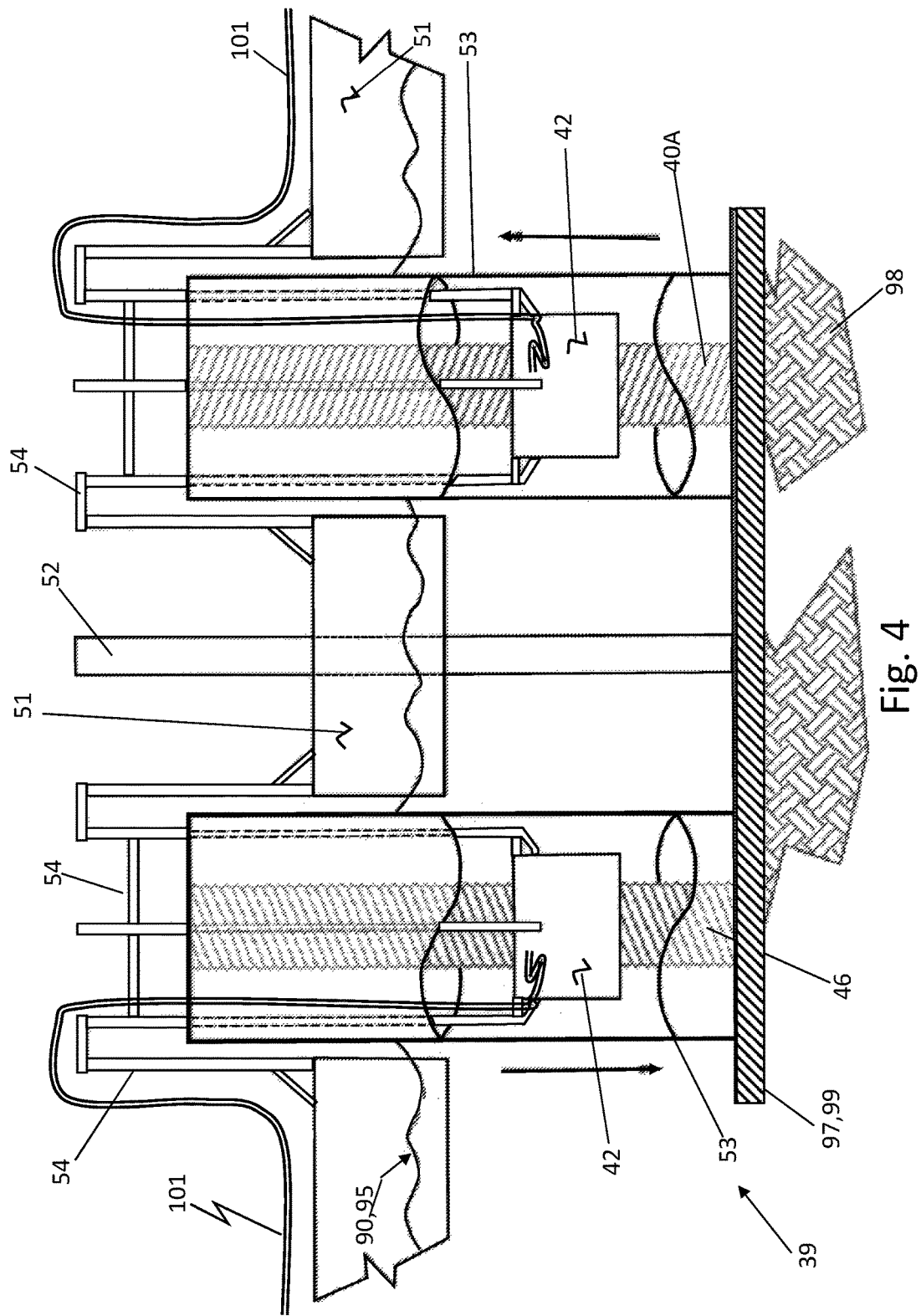
FIG. 4 is a sketch of the double shaft tidal generator device with components denoted.

FIG. 4 is a sketch of the double shaft tidal generator device 39 with components denoted. Portrayed here are the following components and features: a double shafted tidal electric generator 39; a threaded shaft (clockwise) 40; a threaded shaft (counter clockwise) 40A; a threaded bushing 41 between shaft 40,40A and wheel 48 or platform 51; a generator 42, small, medium large as application dictates; a driveshaft 43; a set of gears 44; an optional slidable/Non-Provisional movable speed control weights 45; a wheel lock 46; a great wheel 48; a friction roller column 49; a floating generator 50 with rotator and stator; a floating platform 51; a platform stabilizer columns 52; a protection enclosure (tube) 53; a support super structure 54 and connect to platform 51; the high tide 90; the low tide 95; a foundation 97 for full tidal electric generator system 30,35,37 and 39; the sea floor 98; a foundation 99 for shafts; a collection grid 100; a group of interconnected power lines 101 from generators 42 to switch 102 and ultimately an electrical power grid 104.

Figure 5:
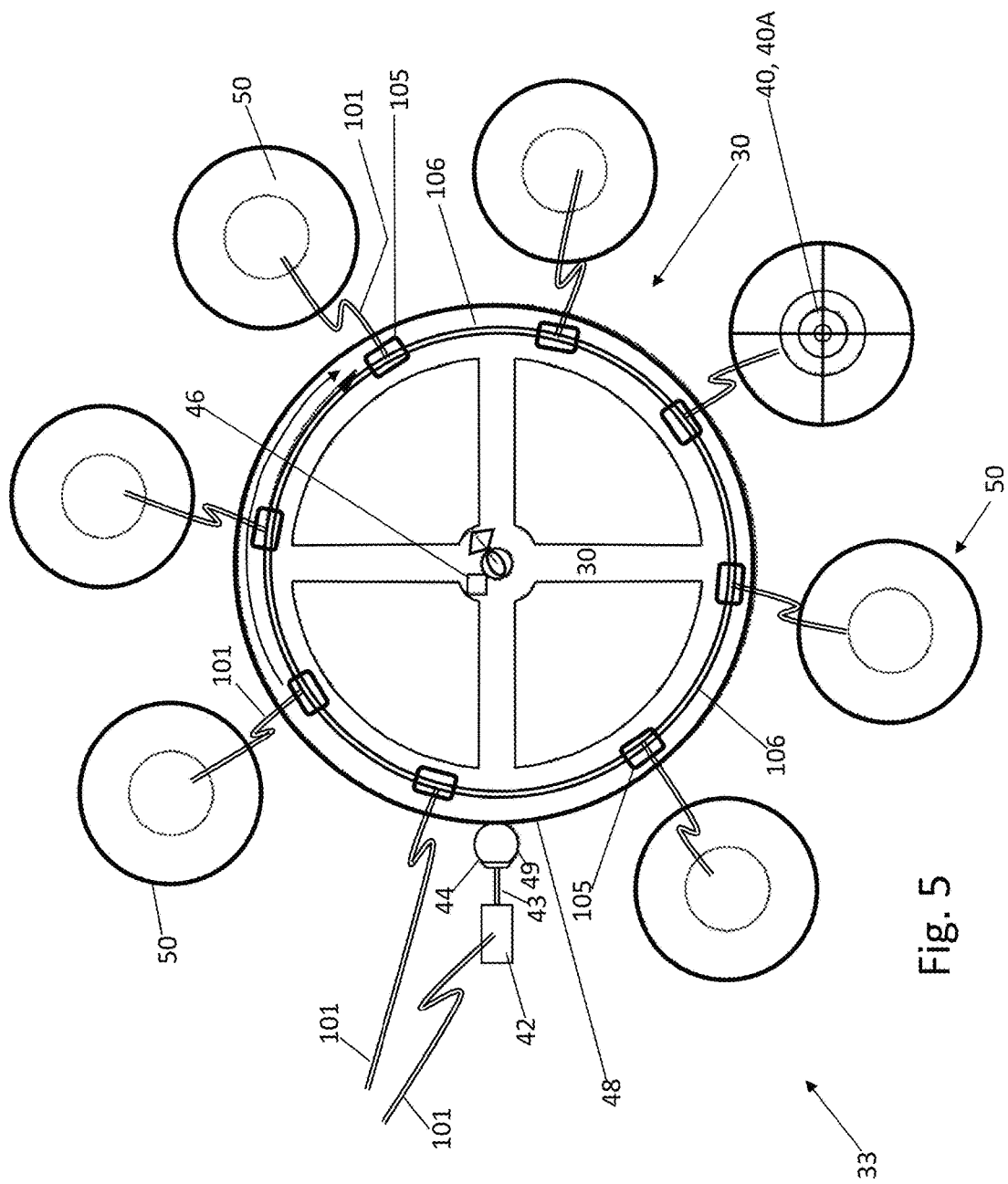
FIG. 5 is a sketch of the combination great tidal wheel and floating generators as another alternative embodiment.

FIG. 5 is a sketch of the combination great tidal wheel and floating generators 33 as another alternative embodiment. In this view are shown and demonstrated: the preferred great wheel tidal electric generator 30; a combination 33 great wheel 30 and floating generators 50; a threaded shaft (clockwise) 40; a threaded shaft (counter clockwise) 40A; a threaded bushing 41 between shaft 40,40A and wheel 48 or platform 51; a generator 42, small, medium large as application dictates; a driveshaft 43; a set of gears 44; a wheel lock 46; a great wheel 48; a friction roller column 49; a floating generator 50 with rotator and stator; power lines 101 from generators 42 ultimately to an electrical power grid 104; a sliding connector 105 from generator 50; and a power ring 106 connecting sliding connectors 105 to power lines 101.

FIGS. 6 A through 6 D are sketches of the floating generator 50 with components shown. These views show: a floatable generator 50 with rotator and stator; a magnet 55; a buoyant core 56; a rotor coil 57 and windings 57A; a stator coil 58 and lamination core; a threaded shaft 59; a typical three phase electrical power chart 64; a bushing plate 65; and a generator housing/surface and structure 66. Another way in which energy can be generated is by placing magnets and copper wire around the shaft so that the movement of the copper wire around the magnets as the great wheel turns creates energy.

Figure 7:
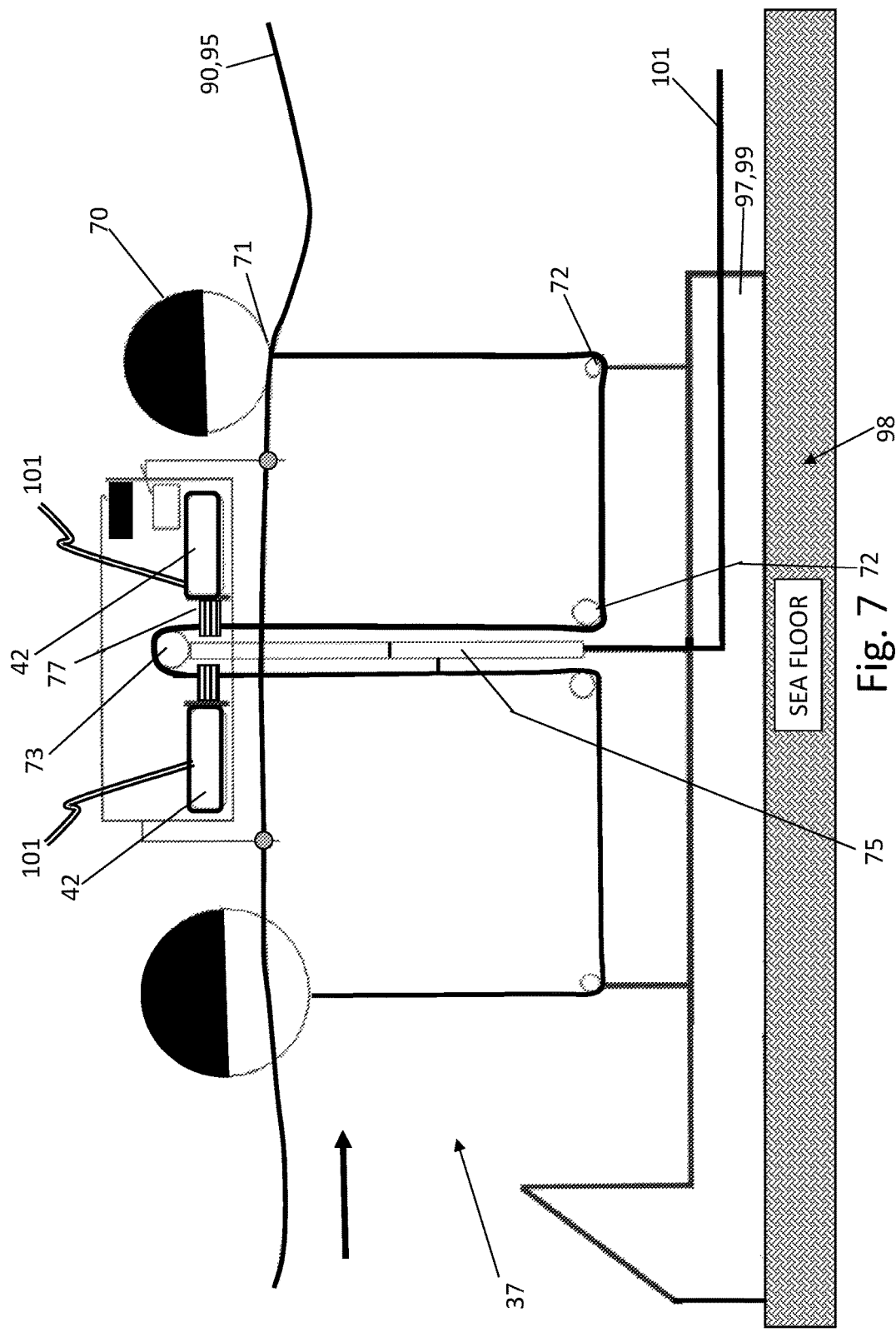
FIG. 7 is a sketch of the outlying bobber and pulley embodiment for the tidal generator system.

FIG. 7 is a sketch of the outlying bobber and pulley embodiment 37 for the tidal generator system. This sketch portrays and demonstrates: an outlying bobber and pulley tidal electric generator 37; a generator 42, small, medium large as application dictates; a stator coil 58 and lamination core; a threaded shaft 59; at least one floating bobbers 60; a set of cables 61; an exterior surface 62 of generator 50; a bobber (floating) 70; a cable attachment 71; a set of pulleys 72; a pulley support column 75; a drive box 77 from cable 71 to generator 42; the high tide 90; the low tide 95; a foundation 97 for full tidal electric generator system 37; the sea floor 98; a foundation 99 for shafts; and a group of interconnected power lines 101 from generators 42 to ultimately an electrical power grid 104.

The preferred great wheel tidal electric generator 30; a combination 33 great wheel 30 and floating generators 50; a multi shaft and generators on large floating platform tidal electric generator 35; an outlying bobber and pulley tidal electric generator 39; and a double shafted tidal electric generator 39 can be configured in many ways and of many materials. The floating and buoy portions can include various kinds of materials, such as metals, plastics, or fiber glass. It can also be of any shape as long as it can carry the structures with ⅓ or ¼ of its volume floating above sea level. The structure and the floating device can be made for the purpose in which case it could be design for better efficiency; the expenses that need to be done are for the bladders, billows or accordions, valves, hoses and propellers, gear box and generator, the device materials have to be made durable, strong, resilient and lasting materials such as rubber, plastic, steel, flexible metals, composite materials and other materials suitable for the job. The invention is made up of a generating power station that performs work. The exact specifications disclosed herein including, but not limited to shapes, sizes, positioning of components, the elevation/depth of components and materials utilized will be chosen by those skilled in the art to meet particular application parameters, and should be tested for maximum efficiency. Additionally, any design specifications mentioned in this document are merely illustrative of the operation of the overall system. These calculations and tests are within the abilities of one skilled in the art of power generation and fluid dynamics, enabling them to practice the invention disclosed herein without undue experimentation or further invention.

Figure 8:
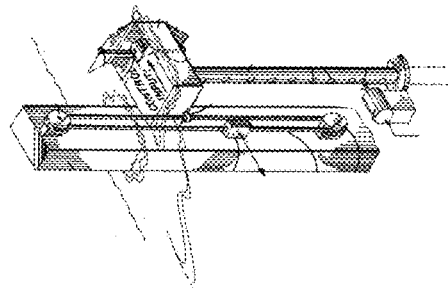
FIGS. 8 A through 8 D are sketches of prior art using energy from tidal action.
Figure 8:
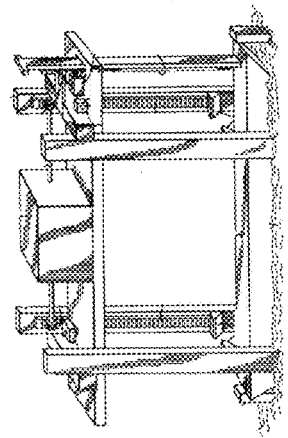
Figure 8:
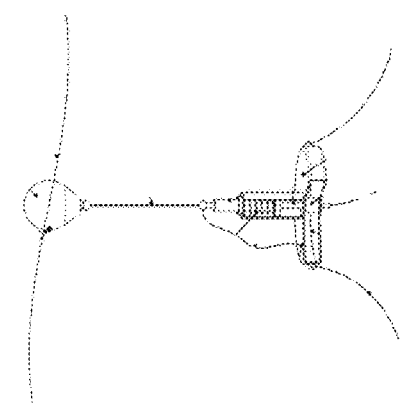
Figure 8:
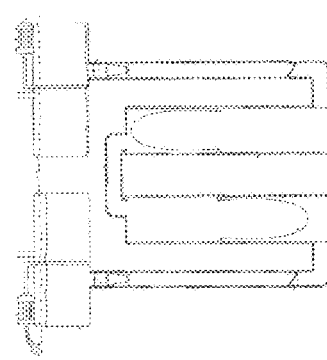

FIGS. 8 A through 8 D are sketches of prior art using energy from tidal action. Show here are: prior art 200 patent application 2011/0113771; prior art 202 U.S. Pat. No. 4,249,085; prior art 204 U.S. Pat. No. 9,038,377; and prior art 206 U.S. Pat. No. 3,959,663.

Figure 9:
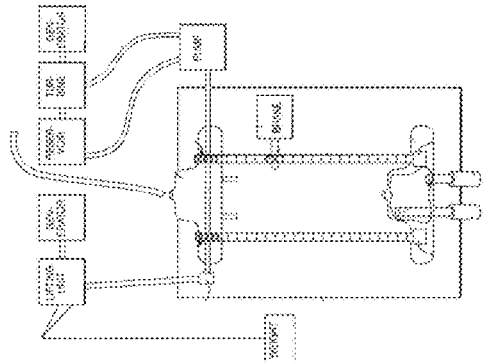
FIGS. 9 A through 9 D are additional sketches of prior art using tidal energy to generate electricity.
Figure 9:
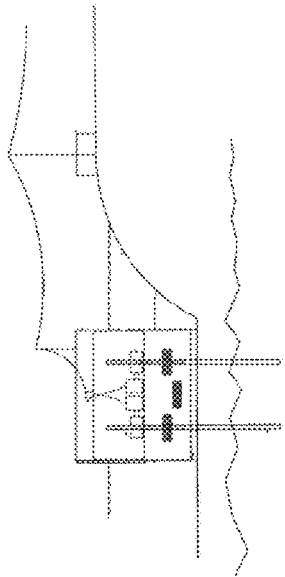
Figure 9:
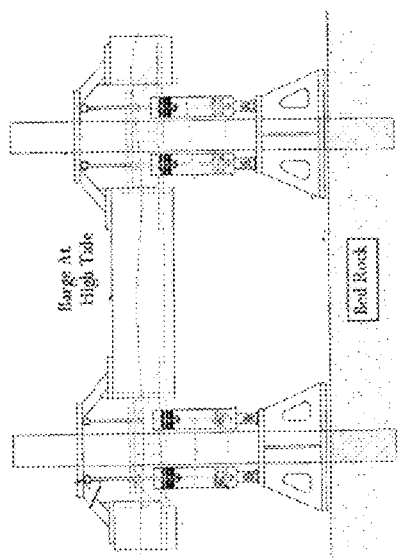
Figure 9:
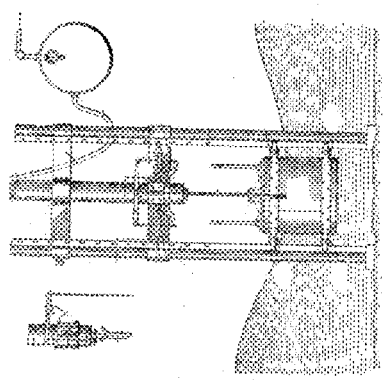

FIGS. 9 A through 9 D are additional sketches of prior art using tidal energy to generate electricity. Other referenced prior art shown here includes: prior art 208 U.S. Pat. No. 6,863,806; prior art 210 U.S. Pat. No. 6,009,207; prior art 212 U.S. Pat. No. 1,105,249; and prior art 214 patent application 2007/0108774.

The details mentioned here are exemplary and not limiting. Other specific components and manners specific to describing a Tidal Electricity Generator device and system 30 may be added as a person, having ordinary skill in the field of electrical power generation from tidal changes well appreciates.

Operation of the Preferred Embodiment

The Tidal Electricity Generator device and system 30 has been described in the above embodiment. The manner of how the device operates is described below. One notes well that the description above and the operation described here must be taken together to fully illustrate the concept of the Tidal Electricity Generator device and system 30. The preferred embodiment of a Tidal Electricity Generator device and system comprise a plurality of stationary units affixed to the sea floor, each stationary unit generally comprising a vertical threaded column within a waterproof housing; further, a traveling element is mounted on the threaded column so as to freely move up and down the column; an external float is positioned outside a waterproof housing is the float is coupled to the traveling element wherein as the float rises and falls with the tides, the traveling element travels up and down the column, provides motion to a generator which in turn has a power cable to an electrical power grid. A first alternative embodiment is a multi-generator and shaft tidal generator made of durable, strong, resilient and lasting materials and comprising at least one generator on an individual floating platform with a threaded shaft; a threaded bushing between shaft and individual floating platform; a generator with a means to be driven by the platform as the platform slowly traverses essentially vertically from a tidal change from high tide to low tide back to high tide; a set of connection plates and fasteners from the threaded shaft connected to a foundation; and a group of interconnected power lines from the at least two generators to an electrical power grid wherein as the float rises and falls with the tides, the traveling element travels up and down the column, provides motion to a generator which in turn has a power cable to an electrical power grid. A second alternative embodiment is a Tidal Electricity Generator device and system made of durable, strong, resilient and lasting materials and comprising: (a). a great wheel/platform with a group of predetermined intermediate spokes, a set of moveable speed control weights, and a lock wherein the great wheel/platform engages an essentially vertical friction roller column; (b). a threaded shaft with clockwise and/or counter clockwise configurations through a threaded bushing between the threaded shaft and the great wheel/platform, wherein the great wheel/platform traverses the threaded shaft essentially vertically during the change from a low to a high tide, and wherein the threaded shaft is supported at a sea floor with a first foundation; (c). the friction roller column with a gear means to turn an essentially horizontal drive shaft and supported by a second foundation; (d). a generator, the horizontal driveshaft and the gear engaging the friction roller and rotating to create electricity within the generator; (e). the first and second foundations complimented and comprising connection plates and fasteners configured to conned the first and second foundation respectively to the threaded shaft and the friction roller column; (f). an interconnected power line from the generator to a switch and a transformer, and ultimately to an electrical power grid wherein as the float rises and falls with the tides, the traveling element travels up and down the column, provides motion to a generator which in turn has a power cable to an electrical power grid.

The Tidal Electricity Generator device and system 30 operates as described in the following. FIGS. 2 A though 2 C of the great wheel the operation is: 1. As the tide recedes, the wheel is unlocked and slowly begins to revolve down the threaded shaft just clear of the waves below it. Weights can be moved in and out along the arms to regulate the speed of the wheel, much like the arms of a spinning skater regulates the speed of the spin. 2. Like an inverted toy top, the great wheel at high tide is at the top of the shaft and locked in place. 3. Because any motion can be converted to energy, as the great wheel spins, one of the ways that this motion can be converted is by the friction of a roller. The roller spins as it touches the great wheel, and with gears attached to it turns the shaft of a generator. 4. At low tide, the great wheel is released from the shaft and allowed to float like a bobber back up to the top of the shaft as the tide rises. In the reverse, the great wheel could be stationary and the shaft spins. The shaft is connected to a generator to produce energy. FIGS. 3 A and 3 B are sketches of the multi generator and shaft alternative tidal generator. It operates: as the great wheel descends, the threaded shaft is forced to spin. As depicted in FIGS. 3 A and 3 B several shafts could be powered by a single large float. FIG. 4 A is a sketch of the double shaft tidal generator device with components denoted. This is showing the Great Wheel being born/supported up on the columns by the tide. Much like a barge tied to a pier, the wheel runs up and down the pilings as the tide rises and lowers.

With this description it is to be understood that the Tidal Electricity Generator device and system 30 and other optional embodiments are not to be limited to only the disclosed embodiment of product. The features of the Tidal Electricity Generator device and system 30 and other embodiments are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A tidal electricity generator device and system made of durable, strong, resilient and lasting materials and comprising:
   (a) a great wheel with a group of predetermined intermediate spokes, a set of moveable speed control weights, and a lock wherein the great wheel engages an essentially vertical friction roller column;
   (b) a threaded shaft with clockwise and/or counter clockwise configurations through a threaded bushing between the threaded shaft and the great wheel, wherein the great wheel traverses the threaded shaft essentially vertically during the change from a low to a high tide, and wherein the threaded shaft is supported at a sea floor with a first foundation;
   (c) the friction roller column with a gear to turn an essentially horizontal drive shaft and supported by a second foundation;
   (d) a generator, the horizontal driveshaft and the gear engaging the friction roller and rotating to create electricity within the generator;
   (e) the first and second foundations comprising connection plates and fasteners configured to connect the first and second foundation respectively to the threaded shaft and the friction roller column;
   (f) an interconnected power line from the generator to a switch and a transformer, and ultimately to an electrical power grid wherein as the great wheel rises and falls with the tides, the great wheel travels up and down the threaded shaft and provides motion to a generator which in turn has a power cable to an electrical power grid.

2. The tidal generator system according to claim 1 wherein the durable, strong, resilient and lasting materials are selected from a group consisting of rubber, plastic, composite materials, steels, flexible metals, and other materials suitable for device.

3. A tidal electricity generator device and system made of durable, strong, resilient and lasting materials and comprising:
   (a) a great wheel with a group of predetermined intermediate spokes, a set of moveable speed control weights, and a lock wherein the great wheel engages an essentially vertical friction roller column;
   (b) a threaded shaft with clockwise and/or counter clockwise configurations through a threaded bushing between the threaded shaft and the great wheel, wherein the great wheel traverses the threaded shaft essentially vertically during the change from a low to a high tide, and wherein the threaded shaft is supported at a sea floor with a first foundation;
   (c) the friction roller column with a gear to turn an essentially horizontal drive shaft and supported by a second foundation;
   (d) a generator, the horizontal driveshaft and the gear engaging the friction roller and rotating to create electricity within the generator;
   (e) the first and second foundations comprising connection plates and fasteners configured to connect the first and second foundation respectively to the threaded shaft and the friction roller column;
   (f) an interconnected power line from the generator to a switch and a transformer, and ultimately to an electrical power grid and interconnected with a multi generator and shaft tidal generator made of durable, strong, resilient and lasting materials and comprising: at least two generators on an individual floating platform with a threaded shaft; a threaded bushing between shaft and individual floating platform; a generator with a gear to be driven by the platform as the platform slowly traverses essentially vertically from a tidal change from high tide to low tide back to high tide; a set of connection plates and fasteners from the threaded shaft connected to a foundation; and a group of interconnected power lines from the at least two generators to an electrical power grid
   wherein as the great wheel rises and falls with the tides, the great wheel travels up and down the threaded shaft and provides motion to a generator which in turn has a power cable to an electrical power grid.

4. The tidal generator system according to claim 3 wherein the durable, strong, resilient and lasting materials are selected from a group consisting of rubber, plastic, composite materials, steels, flexible metals, and other materials suitable for device.

\* \* \* \* \*